United States Patent [19]
Daniels

[11] 3,935,755
[45] Feb. 3, 1976

[54] TURRET ALIGNMENT APPARATUS

[75] Inventor: Dennis Daniels, Bellevue, Wash.

[73] Assignee: U.S. Amada, Ltd., City of Industry, Calif.

[22] Filed: July 10, 1974

[21] Appl. No.: 487,219

[52] U.S. Cl.................. 74/815; 74/813 L; 74/822
[51] Int. Cl.²........................................ B23B 29/32
[58] Field of Search.......... 74/813 L, 815, 816, 817, 74/826, 822

[56] References Cited
UNITED STATES PATENTS

| | | | |
|---|---|---|---|
| 3,242,771 | 3/1966 | Maier et al. | 74/826 |
| 3,653,282 | 4/1972 | Bouffiou et al. | 74/815 |
| 3,718,055 | 2/1973 | Maier | 74/813 L X |
| 3,797,333 | 3/1974 | Maier | 74/826 |

Primary Examiner—Benjamin W. Wyche
Assistant Examiner—F. D. Shoemaker
Attorney, Agent, or Firm—Seed, Berry, Vernon & Baynham

[57] ABSTRACT

A pair of turrets of a punch press are rotatably coupled to a common drive shaft by chains and sprockets. Releasable couplers are placed between the chains and the drive shaft to allow relative, limited movement between the turrets and the common drive shaft during the insertion into the turrets of alignment shot pins. The limited relative movement allows the turrets to independently, accurately position during insertion of the shot pins without placing strain on the chains, drive shaft or power source.

11 Claims, 4 Drawing Figures

TURRET ALIGNMENT APPARATUS

BACKGROUND OF THE INVENTION

1. Field of the Invention

This invention pertains to turret drive apparatus and, more particularly, to mechanisms for separating a turret or turrets from the drive apparatus during forced, accurate positioning of the turrets.

2. Description of the Prior Art

Turret drives for a single turret, such as in an ironworker, or for pairs of turrets, such as in a punch press, are commonly driven by a single drive shaft using chains and sprockets, gears, timing belts or the like. The power source is generally a relatively low horsepower motor which must, through gear or sprocket chain multipliers, convert a relatively high rpm at the motor to a lower rpm but higher torque at the turret. Due to the drive multiplier, a force imposed on the drive system at the turret can be carried back to the power source and multiplied, causing extensive damage at the power source.

In turret drives, the drive train rotates the turret to a generally aligned position at the desired rotational location. More accurate positioning is then obtained by the use of shot pins which are driven into tapered, circumferentially spaced openings in the turret to bring the turret into an exact alignment. This exact alignment is necessitated either by its correlation with the digital or manual positioning of the workpiece or to maintain perfect alignment between a punch and a die as in the case of a double turret punch press.

The shot pins, of course, exercise a tremendous amount of force on the turrets in order to move the heavy mass of the turrets. A frequent problem resulting from this force is that the force exerted by the shot pins becomes transmitted through the drive train and may damage either the power source or the drive train itself. In some cases, to eliminate the damage, prior art devices have utilized clutches or the like to isolate the power source from the drive shaft during the insertion of the shot pin; however, the drive train between the turret and the drive shaft is still in operation and receives the strain.

In the case of double turrets, the turrets must not only be aligned relative to the power source but also must be aligned relative to each other. Consequently, the drive train between the common drive shaft and the turrets frequently receives the strain caused by the shot pins when the two turrets are brought into exact alignment relative to one another. The strain problem is compounded on production punch presses since it is virtually impossible to manufacture reasonably priced chain and sprocket drives, for example, accurately enough so that upon rotation of the common drive shaft, each of the turrets will be driven exactly the same amount. In some cases, in order to reduce the strain the chains are designed with a certain amount of sloppiness to allow relative movement of the turrets. This sloppiness creates problems for the NC control of the machine, and the inertia of the heavy turrets acts through this sloppiness to cause premature failure of the chain. The chain and sprocket system for a double turret becomes further compounded when an inexperienced operator replaces the chains on the turrets and makes them too tight such that the sloppiness is not available to absorb the misalignment of the turrets. The lack of slop or play has been a frequent problem in the past since an operator's natural tendency is to make the chains as tight as possible to accommodate future natural stretching of the chains.

It is, of course, highly desirable to move the turrets as fast as possible in numerically controlled punching machines so that the operating time in which a workpiece is in the machine is minimized. To accomplish this speed, various power sources and drives are employed. One technique for driving the turrets has been to use a small motor that drives a flywheel which, through a clutch, disengages the flywheel from the drive train to the turrets while simultaneously applying a brake to the turrets themselves. The timing for energizing the clutch and brake is generally determined by the position of the shot pins as they move in and out of the turrets. Since the depth of the holes in the turrets to receive the shot pins in a production machine can never all be exactly the same depth, the limit switches or other sensors for determining the position of the shot pins are normally set for the shallowest holes. As a result, the exact position of a particular shot pin relative to a particular one of the circumferentially spaced holes in the turret is never the same so that frequently the clutch is energized to reengage the drive train with the flywheel prior to the shot pin being fully removed and thus damage occurs.

SUMMARY OF THE INVENTION

It is an object of this invention to temporarily separate a turret from the drive shaft that rotates the turret.

It is another object of this invention to provide a device for separating the turret from the power source for rotating the turret in a manner which always assures that the shot pins are disengaged from the turret prior to reengagement with the power source.

It is another object of this invention to provide a device for allowing independent, limited relative rotation between two turrets.

Basically, these objects are obtained by inserting between the turret and the drive shaft for rotating the turret a releasable coupling member that will allow very limited, relative rotational movement between the turret and its drive shaft during insertion of turret exact-positioning means, such as shot pins. The coupling member is placed as close to the turret as is practicable and, in the case of double turrets, the coupling member or members occur in the drive trains between the two turrets so that one can move relative to the other. The amount of freedom in the rotation of the turrets is limited to an amount not to exceed the capability of the shot pin to pull the turret into exact alignment from its generally located alignment. The limitation on the freedom of decoupled movement precludes the turrets from getting out of synchronous rotation relative to one another and from losing synchronism with the numerical controls and power source. Preferably, the shot pins on the turret and the coupling means and drive train are energized pneumatically through the same source and control so that neither can be operated out of time with the other.

DETAILED DESCRIPTION OF THE PREFERRED EMBODIMENTS

Figure 1:
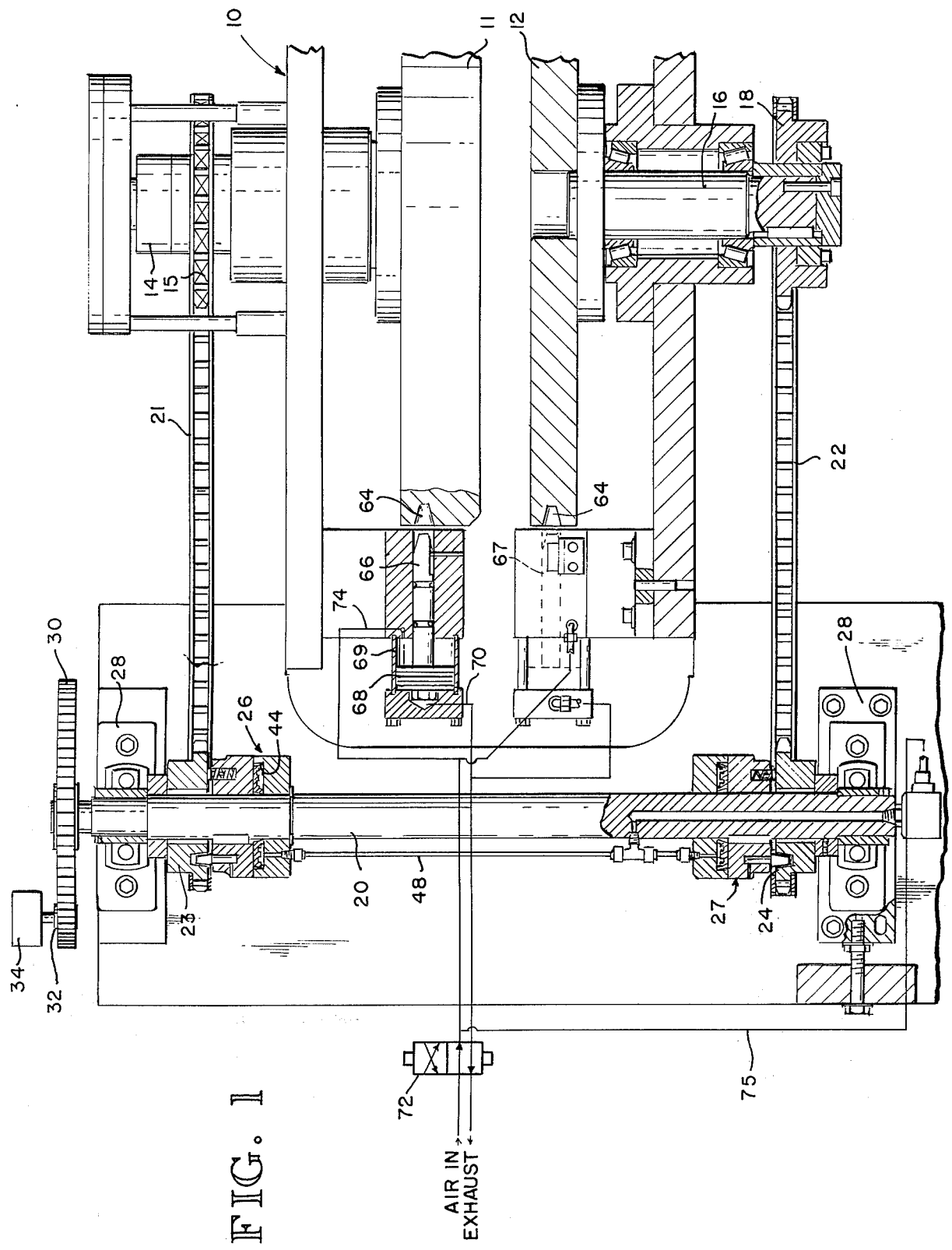
FIG. 1 is a vertical section of a double turret machine embodying the principles of the invention.
Figure 2:
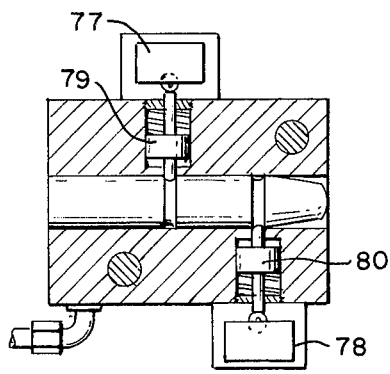
FIG. 2 is a fragmentary detail of a portion of a shot pin utilized in the device of FIG. 1.

As best illustrated in FIG. 1, a numerically controlled machine tool 10 is provided with an upper turret 11 and a lower turret 12. While the invention is best described by illustrating a double-turret, numerically controlled machine tool, it should be understood that some of the principles are applicable also to a single turret machine and to machines which are powered without a numerical control.

The upper turret 11 is rotatably mounted on a shaft 14 on which is keyed a sprocket 15. Likewise, the lower turret is rotatably mounted on a shaft 16 which is keyed to a sprocket 18. The sprockets 15 and 18 are simultaneously rotated by a common drive shaft 20 via an upper chain 21, a lower chain 22, an upper sprocket 23, a lower sprocket 24, and upper and lower releasable decoupling means 26 and 27, respectively. While the embodiment illustrated shows chains and sprockets for driving the turrets, the principles are equally applicable to other forms of rotatable driving members, such as drive gears, timing belts, or the like.

In the embodiment illustrated, the common drive shaft 20 is rotatably mounted on brackets 28 and is keyed to a large driven gear 30. The driven gear is meshed with a smaller drive gear 32 which is driven from a motor 34 or other suitable power source, such as a continuously driven flywheel. Suitable clutching mechanisms can be placed between the drive shaft 20 and the power source if desired. In almost all instances, however, there will be a multiplier between the power source and the turret to enable a high-speed, low-torque motor to drive the extremely heavy turrets. In the case illustrated, the ratio is approximately 200:1.

Figure 3:
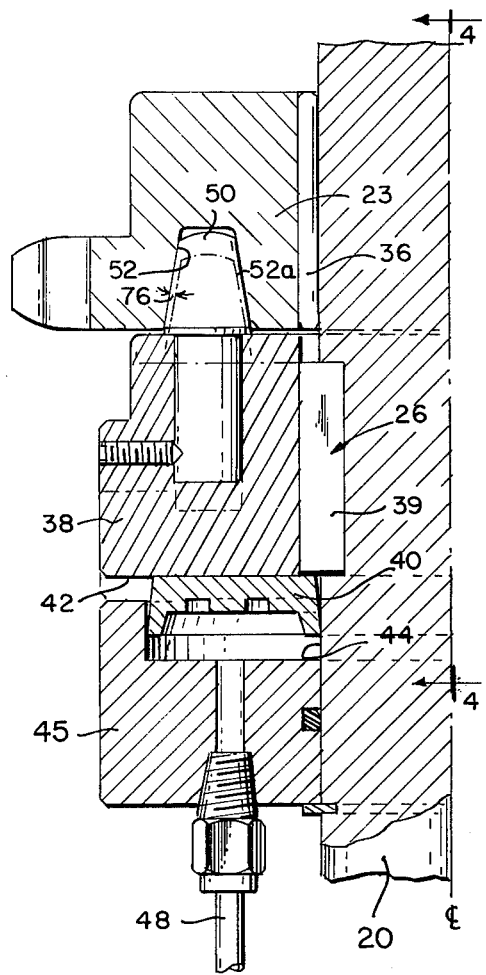
FIG. 3 is a fragmentary detail of one of the decoupling members shown in FIG. 1.
Figure 4:
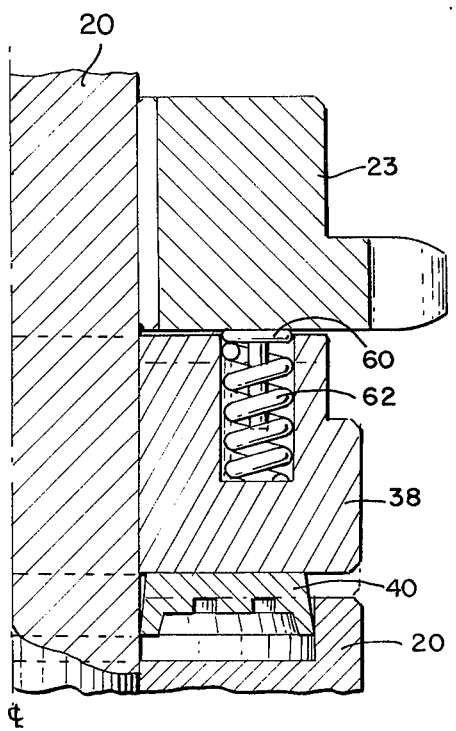
FIG. 4 is a fragmentary detail of the decoupling member as viewed along arrows 4—4 of FIG. 3.

The decoupling means 26 and 27 are identical and only coupling means 26 will be described in detail. As is best shown in FIG. 3, the sprocket 23 is mounted on a bushing 36 that allows rotation of the sprocket relative to the drive shaft 20. The releasable coupling means 26 is provided with a movable body 38 that is keyed to the shaft 20 as at 39 and thus, at all times, rotates with the shaft. A piston 40 engages the end surface 42 of the movable body member. The piston is reciprocably mounted in a circumferential bore 44 of a cylinder 45 that surrounds the shaft 20. Air to extend the piston comes from a line 48 that is common to both of the decoupling means 26 and 27.

Extending outwardly axially of the shaft 20 is a pair of dogs 50. The dogs are tapered to fit within tapered bores 52 in the sprocket 23. When the piston 40 is fully extended, the dogs are pushed fully into the bores 52. The movable body member 38 is also provided with a plurality of circumferentially spaced bumpers 60 that are biased by springs 62 into engagement with the underside of the sprocket 23. When air pressure to the piston 40 is released, the bumpers 60 are pushed outwardly by the springs 62, moving the movable body to the phantom line position shown in FIG. 3 and thus pulling the dogs 50 partially out of the tapered bores 52. As is best shown in FIG. 3, the dogs 52 in the retracted position identified as 52a and shown in phantom lines are only partially moved from their fully inserted position, limiting the relative movement between the sprocket 23 and the movable body member 38 a distance 76 equal to the distance between the tapered surface of the dogs and the tapered surface of the conical bores 52. This distance 76 is approximately or less than the distance between the tapered surface of the one of the shot pins to be described and its mating conical aperture in the turrets.

As is well understood, the turrets 11 and 12 are provided with a plurality of circumferentially spaced, tapered boxes 64 corresponding to the tool stations on the turrets. Positioned on the frame of the machine are upper and lower shot pins 66 and 67. The shot pins and the mechanisms for actuating the shot pins are identical and only the upper mechanism will be described. The upper shot pin 66 is fastened to a piston 68 that is housed in a cylinder 69. An air inlet port 70 couples one end of the cylinder to a two-way, solenoid operated valve 72. The other end of the cylinder is connected by a line 76 to a second port on the valve 72. A line 75 is coupled to the line 74 and to the line 48 for the releasable coupling means 26 and 27. In the position shown, the valve directs air into the cylinders to withdraw the shot pins as illustrated while simultaneously supplying air to the cylinders 44, thus inserting the dogs 50 in each of the decoupling mechanisms 26 and 27. If the valve is shifted to its opposite position, the lines 74 and 48 are connected to exhaust and the lines 70 are connected to the air supply so that the shot pins 66 and 67 are inserted into the turrets while, simultaneously, the air is exhausted in line 48 so that the springs 62 can withdraw the dogs 50 from the sprockets 23 and 24. Since a common valve is used for both the shot pins and the dogs, they can never get out of synchronism with each other, and at all times the air pressure will be released from the pistons 40 prior to the shot pins being fully engaged so that at no time will the shot pins be acting against the drive train or motor.

A pair of switches 77 and 78 is coupled through switch actuators 79 and 80 to indicate when the shot pins have reached fully inserted or fully retracted positions. These signals are used in the controls to initiate the punching operation or turning of the turrets, as is well understood.

As is readily apparent, chains 21 and 22 can be moved relative to each other the limit of the distances 76 between the dogs and the sprockets 23 and 24. Thus turret 11 can be moved relative to turret 12. Either turret, of course, can be rotated slightly relative to the drive shaft 20 and thus relative to the motor 34. Thus the releasable coupling not only isolates the motor from a turret but also, in the case of the double turret machine, isolates each turret from the other.

While the preferred embodiments of the invention have been illustrated and described, it should be understood that variations will be apparent to one skilled in the art without departing from the principles of the invention. Accordingly, the invention is not to be limited to the specific embodiment illustrated.

The embodiments of the invention in which a particular property or privilege is claimed are defined as follows:

1. In a machine tool apparatus having rotatable turret means, a power source, a drive shaft rotatably coupled to said power source, a drive train coupling said drive shaft to said turret means, and shot pin means engageable with the turret means for aligning the turret means in an exact rotational position, the improvement comprising:

releasable coupling means for providing limited relative rotational movement between said drive shaft and said turret means, and control means for decoupling said releasable coupling means prior to said shot pin means engaging said turret means for freeing the turret means from the drive shaft during turret means exact alignment and for coupling the releasable coupling means immediately upon disengagement of said shot pin means from said turret means.

2. Apparatus as defined in claim 1, said turret means including a pair of turrets.

3. Apparatus as defined in claim 2, said releasable coupling means including interengaging means having a first member which is fixed to the drive shaft and a second member fixed to the drive train, and dog means for partially disengaging said first and second members for limited relative movement but restricting further relative movement beyond said limited movement so as to preclude misalignment of the turret relative to said drive shaft.

4. Apparatus as defined in claim 3, said dog means including tapered dog and aperture means movable relative to one another wherein full insertion positively locks them together but partial insertion allows limited relative movement to the extent of said taper without totally uncoupling the dog and aperture.

5. Apparatus as defined in claim 1, said control means including a first pneumatic actuator for coupling and uncoupling said turret means and drive shaft, a second pneumatic actuator for inserting and retracting said shot pin means, and common valve means for operating said first and second pneumatic actuators wherein one of said actuators cannot be operated without operating the other and thus preventing engagement of the shot pin means only after disengagement of the coupling means.

6. Apparatus as defined in claim 1, said turret means including a pair of turrets, said drive train including a first pair of sprockets rotatably mounted on said drive shaft, a second pair of sprockets keyed to said turrets in alignment with said first sprockets, a pair of chains coupling said first sprockets with said second sprockets, said first sprockets each including an aperture, a pair of pneumatically actuatable, tapered dogs keyed to said drive shaft and movable between inner positions fully inserted in said apertures for locking said first pair of sprockets to said drive shaft and partially retracted positions still within the confines of said apertures for providing limited movement between the first sprockets and the drive shaft.

7. Apparatus as defined in claim 6, said turrets including circumferentially spaced apertures, said shot pin means including pneumatically actuated shot pins insertable in said turret apertures, and common valve means for pneumatically withdrawing said shot pins while simultaneously inserting said dogs so that simultaneous insertion of dogs and shot pins is prevented.

8. Apparatus as defined in claim 1, said turret means including a single turret.

9. Apparatus for coupling a rotary turret of a machine tool to a drive shaft comprising:
a power source,
a drive shaft coupled to said drive source for rotary movement,
a turret,
means for rotatably mounting the turret,
means for aligning said turret at a desired location during rotation, and
coupling means interconnecting said turret and said drive shaft for simultaneous rotation, said coupling means including means for temporarily allowing limited rotational movement between said turret and said drive shaft while aligning said turret at said desired location and precluding relative rotation beyond said limited rotational movement so as to preclude misalignment between the drive shaft and turret.

10. A releasable coupling device for joining a rotary power source, through power transmission means, to a rotary turret of a machine tool, said rotary turret having shot pin means for positively rotationally aligning the turret in an exact rotational position, the improvement comprising:
a first member fixed to the power source,
a second member fixed to the power transmission means,
means on said first and second members for locking the members together against relative rotational movement, and
means for partially disengaging said first and second members for limited relative rotational movement, but restricting further relative movement beyond said limited movement so as to preclude misalignment of the turret relative to said power source but allow said turrets to be aligned by said shot pin means relative to said power source.

11. The coupling of claim 10, said locking means on said first and second members including mating tapered dog and aperture means movable axially relative to one another wherein full insertion positively locks the members together against relative rotational movement but partial insertion allows limited relative rotational movement to the extent of the space between the partially engaged dog and taper without totally uncoupling the dog and aperture means.

* * * * *